Figure 1:
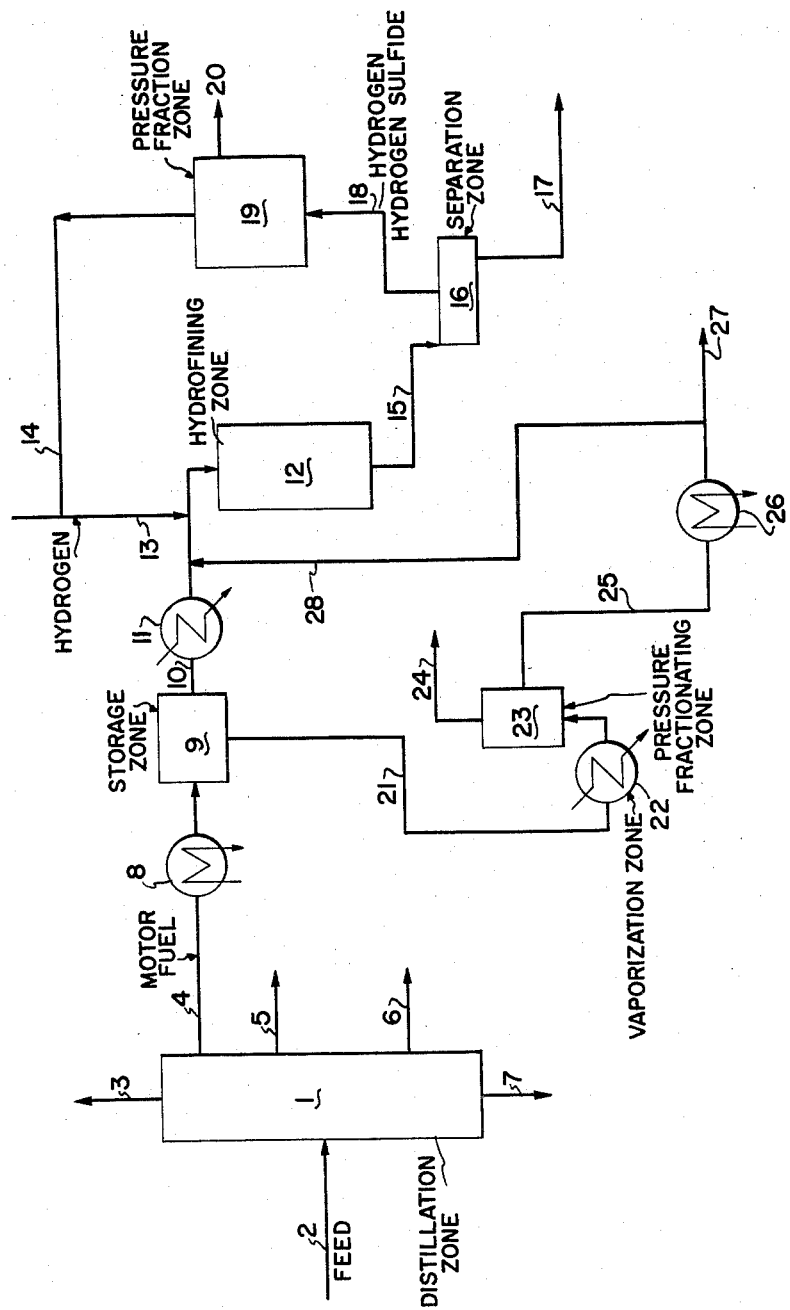
Figure 2:
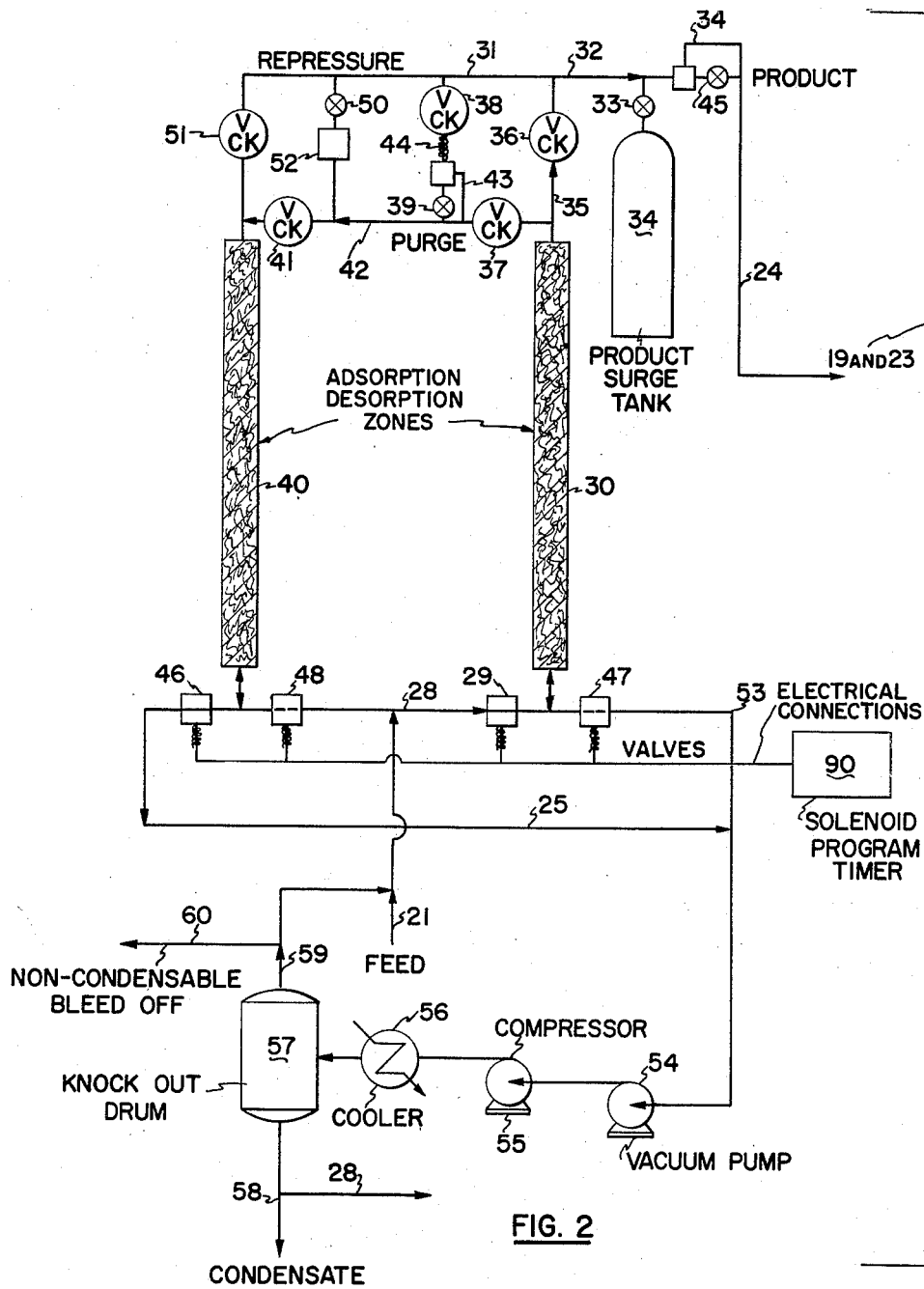

Charles W. Skarstrom
Richard P. Crowley    Inventors
William O. Heilman
By W. O. Heilman  Patent Attorney Charles W. Skarstrom
Richard P. Crowley  Inventors
William O. Heilman
By W. O. Heilman  Patent Attorney

United States Patent Office 3,102,853
Patented Sept. 3, 1963

3,102,853
DESULFURIZING FLUIDS UTILIZING PRESSURE
CYCLING TECHNIQUE
Charles W. Skarstrom, Montvale, Richard P. Crowley, Westfield, and William O. Heilman, Short Hills, N.J., assignors to Esso Research and Engineering Company, a corporation of Delaware
Filed Oct. 5, 1960, Ser. No. 60,726
4 Claims. (Cl. 208—211)

The present invention is broadly concerned with the processing of fluid streams for the removal of objectionable sulfur compounds. The invention is more particularly concerned with the desulfurization of hydrocarbon streams employing a combination technique which involves an extension and comprises a particular adaptation of the process and apparatus described in U.S. Patent 2,944,627, issued July 12, 1960, entitled "Method and Apparatus for Fractionating Gaseous Mixtures by Adsorption," inventor: Charles W. Skarstrom. While the improved combination technique of the present invention may be utilized with various known methods for desulfurizing petroleum hydrocarbons, it is particularly useful and desirable in combination with a hydrofining technique especially for the segregation of hydrogen from the recycle stream comprising hydrogen and hydrogen sulfide.

It is well known in the art to remove sulfur compounds from gas streams such as petroleum hydrocarbon streams by various techniques. For example, it has been suggested that harmful sulfur compounds such as hydrogen sulfide, mercaptans thiophene, and the like, be removed from hydrocarbon streams utilizing various absorbents such as clay, bauxite, and the like. Other methods used are the sulfuric acid treatment, the treatment with alkali reagents, such as sodium hydroxide, and with the so-called "doctor sweetening process." Other sweetening processes utilized have been the hydrochloride treating method, the copper chloride sweetening method, as well as the lead sulfide and sulfur sweetening method. Air treating as well as extractive treating techniques have been utilized employing solutizing reagents. In accordance with the present invention, the technique taught in the above-identified patent, U.S. 2,944,627, is effectively used in combination with these known processes for the removal of sulfur compounds. The technique taught in the above-identified patent is particularly adapted for use in combination with a hydrofining technique for the removal of sulfur compounds.

In the hydrofining technique, a feed stream containing various sulfur compounds, such as mercaptans, disulfides, thiophenes, and the like, are treated at elevated temperatures in the presence of a catalyst. Under these conditions, the mercaptans as well as the disulfides and thiophenes are converted to produce hydrogen sulfide. The feed stream to the reactor is usually mixed with a hydrogen containing gas. The precise conditions may vary widely depending upon the particular feed stream being desulfurized as well as upon the type of sulfur compounds present. In general, the temperatures vary from about 550° F. to about 700–750° F. The pressures vary from about 300 lbs./sq. in. to about 500–550 lbs./sq. in., preferably about 400 lbs./sq. in. Generally, the effect of increasing the hydrogen concentration increases the amount sulfur is reduced. The hydrogen partial pressure as a matter of fact correlates very well with the degree to which the sulfur is removed. Also, a high hydrogen concentration improves the catalyst life. While a number of catalysts may be utilized in the hydrofining operation, preferred catalysts are cobalt molybdate on alumina as well as molybdenum on alumina. Other catalysts, for example, activated aluminum, may also be utilized.

The process of the present invention may be more fully understood by reference to the drawings illustrating one embodiment of the same. FIGURE I is a diagrammatical sketch of a distillation zone in combination with a hydrofining zone, also in combination with a zone employing the pressure cycling technique of the above-identified patent. FIGURE II is a diagrammatical sketch showing in some detail the processing of the gaseous streams in accordance with the present invention for the removal of the undesirable sulfur compounds.

Referring specifically to FIGURE I, a hydrocarbon feed stream is introduced into distillation zone 1 by means of line 2. This feed stream may comprise a crude oil or a selected fraction of the crude such as a gas oil or heavier fraction. Distillation zone 1 may comprise a single zone such as a pipe still or a plurality of distillation stages. Temperature and pressure conditions are maintained in zone 1 to remove overhead by means of line 3 hydrocarbons boiling below the motor fuel boiling range which range is generally about 100° F. to about 450° F. A hydrocarbon fraction boiling in the motor fuel boiling range is removed by means of line 4 while heavier fractions are removed by means of lines 5, 6, and 7 respectively. The fraction boiling in the motor fuel boiling range containing undesirable sulfur compounds such as mercaptans, mercaptides, thiophenes, and the like is cooled in zone 8 and passed to storage zone 9.

One adaptation of the present invention is to withdraw this stream from zone 9 by means of line 10, vaporize the same in zone 11 and then to introduce this fraction into hydrofining zone 12, which contains a catalyst as, for example, cobalt molybdate on aluminum. The temperature in zone 12 is maintained at about 600° F. while the pressure is about 200–300 lbs./sq. in. A relatively small amount of hydrogen, generally less than about 50 s.c.f./b. is introduced into the feed stream by means of line 13. This hydrogen may be recycled hydrogen from line 14 secured as hereinafter described. As pointed out heretofore, under the conditions of the reaction the mercaptans, the disulfides and thiophenes are converted to hydrogen sulfide. The treated stream is withdrawn from reactor 12 by means of line 15 and passed into a separation zone 16. Here the product stream, substantially free of mercaptans, thiophenes and disulfides, is removed by means of line 17 and may be further treated in any manner desirable for the removal of hydrogen sulfides and traces of other undesirable sulfur compounds. A gaseous mixture comprising hydrogen and hydrogen sulfide is removed by means of line 18, passed through pressure fractionating zone 19 which will be hereinafter described. The hydrogen free of hydrogen sulfide is removed from zone 19 by means of line 14, and preferably recycled to zone 12, while the hydrogen sulfide is removed from zone 19 by means of line 20 and handled in any manner desired. It is to be understood that the stream withdrawn by means of line 4 may be passed directly into zone 12 without the necessity of condensing and re-vaporizing the same.

A particular adaptation of the present invention is to remove the stream from zone 9 by means of line 21 which stream contains various sulfur compounds such as hydrogen sulfide, mercaptans, disulfide, tiophene and the like, and to vaporize this stream in zone 22. This vapor is passed into a pressure cycling fractionating zone 23 wherein conditions are adjusted, which will hereinafter be described, to remove by means of line 24 a hydrocarbon stream substantially free of undesirable sulfur compounds. This stream may be condensed and thereafter treated or blended as desired.

A stream comprising hydrocarbons and sulfur compounds is removed from pressure fractionating zone 23 by means of line 25 and handled in a manner to remove the sulfur compounds therefrom. From the description hereinafter given, the concentration of the sulfur compounds in the hydrocarbons from line 25 is substantially greater than the concentration of the sulfur compounds in the hydrocarbon stream removed by means of line 21. Thus, this stream, removed by means of line 25, may be handled by various known techniques for the removal of these sulfur compounds, such as the Girbotol process, the air sweetening process, and other processes for the removal of sulfur compounds hereinbefore enumerated.

However, it is preferred that this stream be freed of the sulfur compounds by passing the same to the hydrofining zone 12 which is operated in a manner as hereinbefore described. Thus, while the stream removed by means of line 25 may be condensed in zone 26 and passed to other known desulfurization processes by means of line 27, it is preferred to pass this stream to hydrofining zone 12 by means of line 28. Under this latter adaptation of the invention, a pressure cycling zone 23 will be positioned before the hydrofining zone 12 as well as subsequent thereto, namely zone 19. This simply means that it will be necessary only to hydrofine a relatively small quantity of the stream removed by means of line 4 since substantial quantities of sulfur were removed in zone 23 from the hydrocarbon stream segregated by means of line 24.

Referring specifically to FIGURE II, the operation of pressure cycling fractionating zones 19 and 23 are specifically described. These zones comprise dual beds. The fluids from zone 9 containing sulfur compounds and removed by means of line 21 are introduced into bed 30 by means of lines 21 and 28. This feed gas comprising hydrocarbons boiling in the motor fuel boiling range and objectionable sulfur compounds passes through an open solenoid operating valve 29 and is introduced into the bottom of bed 30. Both beds 30 and 40 are packed with an adsorbent having a preferential selectivity for sulfur compounds such as hydrogen sulfide. A satisfactory adsorbent comprises activated carbon. Other adsorbents comprise silver on doucil, molecular sieves, and silver on ion exchange resins. Hydrocarbons free of sulfur compounds are removed from the top of bed 30 by means of line 35. This gas flows through check valve 36 and cannot pass through check valve 37. The gas is then divided into two streams. One portion of the gas passes through line 31 while the remainder passes through line 32. Some of the gas passing through line 32 passes through valve 33 and is introduced into a product surge tank 34. The remainder of the desulfurized gas in line 32 passes through valve 45, the rate of which can be adjusted by a flow controller 34. Desulfurized product gas is withdrawn by means of line 24. This gas removed by means of line 24 is passed through a cooling or condensing zone and may further be processed as desired.

That portion of the gas removed by means of line 31 is passed through check valve 38 through valve 39 and into the top of bed 40 by means of valve 41 and line 42. The rate of flow through valve 39 is maintained at the desired rate by flow controller 43 which maintains the desired pressure drop across valve 39. In addition, valve 38 can be spring loaded by means of spring 44 so as to only open after predetermined pressure drop occurs across valve 38.

The gas removed through line 42 passes through check valve 41 and into the top of bed 40 where it backwashes downwardly through the bed. Bed 40 is maintained at a predetermined relatively low pressure below the relatively high pressure existing in adsorption zone 30. The desulfurized gas together with desorbed sulfur constituents is removed from the bottom of bed 40 through line 25. This stream passes through solenoid operated valve 46 through line 25 and is further processed as a hereinafter described. Thus, when bed 30 is on adsorption and bed 40 on desorption valves 29, 36, 33, 45, 38, 41 and 46 are open, whereas valves 47, 48, 37, and 50 are closed. At the end of the cycle when valve 46 closes, valve 50 opens until bed 40 reaches the predetermined high pressure. At this point valve 48 opens and valve 29 closes and valve 47 opens.

The cycle is then continued as hereinbefore described wherein bed 40 is on adsorption and bed 30 is on desorption. A portion of the product gas flowing through valve 51 is used to backwash bed 30, a portion is used to repressure surge tank 34, and the remainder is passed through line 24 as desulfurized product gas. The gas and desorbed components from bed 30 are passed through open valve 47 through line 53, and are handled as hereinafter described.

As mentioned heretofore, zones 23 and 19 of FIGURE I as described in FIGURE II is an apparatus comprising two adsorbent beds which are alternately connected to the high pressure feed. While one bed is at high pressure the other bed is dumped to the low pressure, backwashed with some of the desulfurized product through a flow control valve and brought back up to line pressure with desulfurized product at the product end. These on-off valves are operated and programmed from a multicam recycling electric timer 90 (wiring not shown). The use of two an-off feed and two on-off dump valves allows the low pressure bed to be repressured before the other bed is dumped. This insures continuity in the product pressure and flow.

In accordance with the preferred adaptation of the present invention, a gaseous stream containing sulfur compounds such as a hydrocarbon stream boiling in the motor fuel boiling range is passed cyclically and in alternating sequence, through each of two paired adsorption beds, the ambient atmosphere of the zones being substantially maintained at a temperature such as to maintain the feed materials and the effluent products in a vapor or gas phase. The stream introduced into each bed is passed over and through a body of an adsorbent contained in the zone, which adsorbent material has a selective affinity for the sulfur compounds of the gaseous mixture. During passage of the feed stream of the mixture through a bed, the bed is on adsorption cycle. During this cycle, the bed is maintained at substantially the pressure of the original feed stream introduced thereinto. After passage through the bed, a gaseous effluent product is discharged from the bed at substantially the pressure of the initial stream which is substantially free of sulfur compounds.

While either bed is on an adsorption cycle, pressure on the other bed of the pair is reduced, as by opening it to the atmosphere or another bed at reduced pressure. In this condition, the bed is on a desorption cycle. At substantially the same time, a portion of the primary effluent product from the bed then on an adsorption cycle is withdrawn from the total primary effluent discharge, and this withdrawn portion is introduced into the reduced pressure bed, which is on a desorption cycle, so as to pass over and through the body of the adsorbent contained therein. Passage of this withdrawn portion through the bed on desorption cycle is on counterflow relation to passage of the initial stream passed through such beds while it was on the adsorption cycle. Thus, in essence, zone 23 as well as zone 19 of FIGURE I each comprise two zones 30 and 40 as described with respect to FIGURE II.

As pointed out above, the present invention is concerned with a method of removing sulfur compounds from a gaseous material. In essence, the operation comprises flowing a stream of gaseous material through a bed of adsorbent at a preselected initial pressure and flow direction. The adsorbent is selective for at least certain sulfur constituents of said material. The stream is flowed through the bed for a first cycle period less than that required for the bed to come to equilibrium with the sulfur compounds. A primary effluent porduct comprising a desulfurized stream is discharged from the bed. At the end of the first cycle period, the flow of the feed stream is interrupted and the initial pressure on the bed reduced. The adsorbed sulfur components are desorbed from the bed at the reduced pressure. These desorbed sulfur components are discharged from the bed in a flow direction opposite to the flow direction of the feed stream of the gaseous material for a second cycle period. During the second period at least a portion of the primary effluent product is passed through the bed in a flow direction of the desorbed sulfur components. This latter mixture comprising a portion of the primary effluent product and the desorbed sulfur components are discharged from the bed as a secondary effluent product. The cycle periods are adjusted for a time duration adapted to develop a concentration gradient of the sulfur components in said bed wherein the gradient has a front of lowest concentration in a zone intermediate the ends of the bed. An oscillatory movement is imparted to the front substantially within the limits of the zone in a direction and for a distance which corresponds respectively to the direction of the flow through the bed during each cycle period and to the duration thereof.

That portion of the hydrocarbon backwashed and the desorbed sulfur constituents are passed through line 53 by means of a vacuum pump 54 or equivalent. These gases are compressed in compressor 55, cooled in cooler 56 in order to condense out condensable constituents. The stream is passed to a knockout or equivalent zone 57 wherein the condensate is removed by means of line 58. Uncondensed constituents are removed overhead from zone 57 by means of line 59 and are preferably recombined with the feed. Under certain conditions, it may be desirable to bleed off a portion of these gases by means of line 60.

The hydrocarbon condensate removed by means of line 58 as pointed out heretofore may be treated in any conventional manner, such as by copper chloride, hydrochloride treatment for the removal of the sulfur compounds which have been concentrated in this fraction. However, as pointed out heretofore, it is preferred that this hydrocarbon stream containing the concentrate of sulfur compound is passed through line 28 and introduced into hydrofining zone 12. In this zone the stream is hydrofined in a manner to convert all sulfur compounds such as mercaptans and the like to hydrogen sulfide, which hydrofined stream is removed by means of line 15 and processed in heatless pressure cycling fractionating zone 19. Zone 19 is similar to and will be operated in a manner as described with respect to zone 23. Since the sulfur compounds are largely hydrogen sulfide after refining, satisfactory adsorbents may comprise activated carbon, 4A, 5A, and 13W molecular sieves as well as other adsorbents having the preferential selectivity for hydrogen sulfide as compared to hydrocarbon constituents.

Under certain circumstances, it may be desirable to remove the stream from distillation zone 1 by means of line 4 and to introduce this stream directly into the hydrofining operation of zone 12.

Thus, the present invention generally is concerned with the removal of sulfur compounds from hydrocarbon streams containing the same such as natural gas streams, normally liquid hydrocarbon streams from the various distillation units and using in combination a pressure cycling adsorption technique wherein an oscillating gradient in the various sulfur components may move upwardly and downwardly in the respective zones in combination with a known method for the removal of sulfur compounds from hydrocarbons and other fluid streams. A preferred adaptation of the present invention is to use the pressure cycling fractionating technique in conjunction with a hydrofining operation, and to particularly use the hydrofining operation intermediate two zones in the pressure cycling fractionating technique.

In general, any adsorbent having a selectivity for sulfur compounds may be used. Satisfactory adsorbents are, for example, activated carbon, beauxite, activated alumina, molecular sieves, and the like. The pressure may be varied appreciably and will depend to a great extent upon the pressures of the feed gases from the distillation and other zones. It is preferred that the relatively high pressure be in the range from about 30 to 90 lbs./sq. in., preferably about 60 lbs./sq. in. absolute and that the relatively low pressure be atmospheric although under certain conditions the relatively high pressure may be about atmospheric pressure and the relatively low pressure be about 3 to 5 lbs/sq. in. absolute. However, if the hydrofining operation of zone 12 is carried out at a pressure of from about 300 to 400 lbs./sq. in., then the relatively high pressure of zone 19 is preferably 10 to 50 lbs. below the pressure of the hydrofining zone. The relatively low pressure of zone 19 under these conditions is in the range from 50 to 100 lbs./sq. in. gauge.

In general, temperature of the beds should be maintained sufficient to keep the constituents in the vapor phase under the pressure conditions existing. Thus, when processing a hydrocarbon fuel boiling in the motor fuel boiling range the temperature of the beds should be above about 500° F., preferably in the range from 700–800° F. Under these conditions, beds 30 and 40 should be maintained within an enclosure wherein the temperatures about the beds 30 and 40 and within the enclosure are maintained at the temperature of operation. Thus, substantially no heat will flow into or be removed from beds 30 and 40. In essence, this simply means that beds 30 and 40 are operating at an ambient temperature which is the relatively high temperature maintained without the beds. This relatively high ambient temperature may be maintained by any suitable means as, for example, by heating oils and the like. A very desirable method of maintaining the ambient at a relatively high temperature without beds 30 and 40 is to pass a portion of the feed gas into and through the area within the enclosure and without zones 30 and 40.

What is claimed is:

1. An improved process for the removal of sulfur compounds from a gaseous mixture utilizing two adsorbent beds each of which is charatcerized by having a one end and an other end, said process comprising the steps of flowing a feed stream of a gaseous mixture including sulfur compounds from the one end to the other end through a first bed of an adsorbent at a preselected initially relatively high pressure and in a positive flow direction in an initial cycle, said adsorbent having a selectivity for said sulfur compounds, discharging said gaseous mixture stream from said first bed as a desulfurized primary effluent, segregating a portion of said desulfurized primary effluent and withdrawing same, passing the remainder of said desulfurized primary effluent in reverse flow from the other end to the one end through a second bed of adsorbent at a relatively low pressure which adsorbent is relatively saturated with said sulfur compounds as compared to said first bed at the start of said initial cycle, and withdrawing the same as a secondary effluent, whereby said initial cycle continues, said first bed becomes relatively saturated with said sulfur compounds progressively from said one end toward said other end, and whereby said second bed becomes relatively freed from said sulfur compounds from said other end toward said one end, continuing said initial cycle for a time period less than that required to secure relatively saturation of said first bed at said other end and that required to secure freedom from said sulfur compounds of said second bed at said one end, thereafter introducing said feed stream into said one end of said second bed in a positive flow direction at said initial relatively high pressure, discharging said gaseous stream from said other end of said second bed as a desulfurized primary effluent, segregating a portion of said last named desulfurized primary effluent as a product stream and withdrawing same, passing the remainder of said last named primary effluent in reverse flow from said other end to said one end of said first bed of adsorbent at said relatively low pressure whereby said remainder of said last named primary effluent is recontaminated with said sulfur compounds, withdrawing said remainder as a secondary effluent and thereafter cyclically continuing the operation, passing said second effluent to a desulfurization zone wherein said desorbed sulfur compounds are removed from said secondary effluent and said desulfurized secondary effluent is combined with said primary effluent.

2. Process as defined by claim 1 wherein said secondary effluent is passed to a hydrofining zone wherein said sulfur compounds are removed from said secondary effluent, thereafter combining the desulfurized secondary effluent with said primary effluent.

3. Process for the removal of sulfur compounds from fluid hydrocarbon streams containing the same which comprises in combination a primary zone utilizing two adsorbent beds each bed of which is characterized by having a one end and an other end, and a hydrofining operation, said process comprising the steps of flowing a feed stream of a gaseous mixture of hydrocarbons containing sulfur compounds into said primary zone from the one end to the other end through a first bed of an adsorbent at a preselected initially relatively high pressure and in a positive flow direction in an initial cycle, said adsorbent having a selectivity for said sulfur compounds, discharging said gaseous mixture stream from said first bed as a desulfurized primary effluent, segregating a portion of said desulfurized primary effluent and withdrawing same, passing the remainder of said desulfurized primary effluent in reverse flow from the other end to the one end through a second bed of adsorbent at a relatively low pressure which adsorbent is relatively saturated with said sulfur compounds as compared to said first bed at the start of said initial cycle, and withdrawing the same as a secondary effluent, whereby as said initial cycle continues, said first bed becomes relatively saturated with said sulfur compounds progressively from said one end toward said other end, and whereby said second bed becomes relatively freed from said sulfur compounds from said other end toward said one end, continuing said initial cycle for a time period less than that required to secure relatively saturation of said first bed at said other end and that required to secure freedom from said sulfur compounds of said second bed at said one end, thereafter introducing said feed stream into said one end of said second bed in a positive flow direction at said initial relatively high pressure, discharging said gaseous stream from said other end of said second bed as a desulfurized primary effluent, segregating a portion of said last named desulfurized primary effluent as a product stream and withdrawing same, passing the remainder of said last named primary effluent in reverse flow from said other end to said one end of said first bed of adsorbent at said relatively low pressure, withdrawing the same as a secondary effluent and thereafter cyclically continuing the operation, passing said secondary effluent and hydrogen to said hydrofining operation wherein said sulfur compounds are converted to hydrogen sulfide, thereafter separating said hydrogen sulfide from said secondary effluent and combining said desulfurized secondary effluent with said primary effluent of said primary zone, passing said hydrogen sulfide and unreacted hydrogen to a secondary zone utilizing a third and fourth adsorbent beds each of which is characterized by having a one end and an other end, said process comprising the steps of flowing said hydrogen sulfide and unreacted hydrogen from the one end to the other end through said third bed of an adsorbent, of said secondary zone, at a preselected initially relatively high pressure and in a positive flow direction in an initial cycle, said adsorbent having a selectivity for said hydrogen sulfide, discharging a stream comprising hydrogen from said third bed as a desulfurized primary effluent, segregating a portion of said desulfurized primary effluent and recycling the same to said hydrofining operation, passing the remainder of said desulfurized primary effluent in reverse flow from the other end to the one end through said fourth bed of adsorbent at a relatively low pressure which adsorbent is relatively saturated with said hydrogen sulfide as compared to said first bed at the start of said initial cycle, and withdrawing the same as a secondary effluent, whereby as said initial cycle continues, said third bed becomes relatively saturated with said hydrogen sulfide progressively from said one end toward said other end, and whereby said fourth bed becomes relatively freed from hydrogen sulfide from said other end toward said one end, continuing said initial cycle for a time period less than that required to secure relatively saturation of said third bed at said other end and that required to secure freedom from hydrogen sulfide of said fourth bed at said one end, thereafter introducing said hydrogen sulfide and hydrogen into said one end of said fourth bed in a positive flow direction at said initial relatively high pressure, discharging said gaseous stream comprising hydrogen from said other end of said fourth bed as a desulfurized primary effluent, segregating a portion of said last named desulfurized primary effluent as a product stream and recycling the same to said hydrofining operation, passing the remainder said last named primary effluent in reverse flow from said other end to said one end of said third bed of adsorbent at said relatively low pressure, withdrawing the same as a secondary effluent and thereafter cyclically continuing the operation.

4. Process as defined by claim 3 wherein said hydrofining zone is carried out at a temperature in the range from about 550° F. to about 750° F. and the pressure in the range from 300 to 500 lbs./sq. in. gauge and wherein the catalyst comprises cobalt molybdate on alumina.

References Cited in the file of this patent
UNITED STATES PATENTS

| | | |
|---|---|---|
| 2,800,430 | Porter et al. | July 23, 1957 |
| 2,844,517 | Inwood | July 22, 1958 |
| 2,944,627 | Skarstrom | July 12, 1960 |
| 2,984,617 | De Chellis et al. | May 16, 1961 |
| 2,988,499 | Kenny | June 13, 1961 |